United States Patent
Kamber et al.

[15] 3,642,234
[45] Feb. 15, 1972

[54] AIRCRAFT

[72] Inventors: Heinrich Kamber, Lucerne; Werner Hausammann, Feldmeilen, both of Switzerland; Henri Deplante, Paris, France

[73] Assignees: Avions Marcel Dassault, Vaucresson, France; Confedereration Suisse, rep. by Fabrique Federale D'Avions, Emmen, Switzerland

[22] Filed: Dec. 23, 1969

[21] Appl. No.: 887,541

[30] Foreign Application Priority Data

Dec. 30, 1968 France.....................182227

[52] U.S. Cl....................................................244/45
[51] Int. Cl..........................................B64c 3/08
[58] Field of Search....................244/45, 87, 89, 35, 102

[56] References Cited

UNITED STATES PATENTS

| | | | |
|---|---|---|---|
| 2,430,793 | 11/1947 | Wells | 244/45 X |
| 2,601,962 | 7/1952 | Douglas | 244/89 X |
| 2,693,325 | 11/1954 | Lippisch | 244/45 X |
| 2,814,454 | 11/1957 | Atkins et al. | 244/102 |

*Primary Examiner*—Trygve M. Blix
*Assistant Examiner*—Carl A. Rutledge
*Attorney*—William J. Daniel

[57] ABSTRACT

An aircraft for high-speed flight comprising a fuselage, a main plane or wing and a retractable stabilizer or empennage comprising aerofoils adapted and profiled for subsonic flight conditions and arranged to produce, when deployed, a lift-giving rise to a nose-up pitching moment.

7 Claims, 9 Drawing Figures

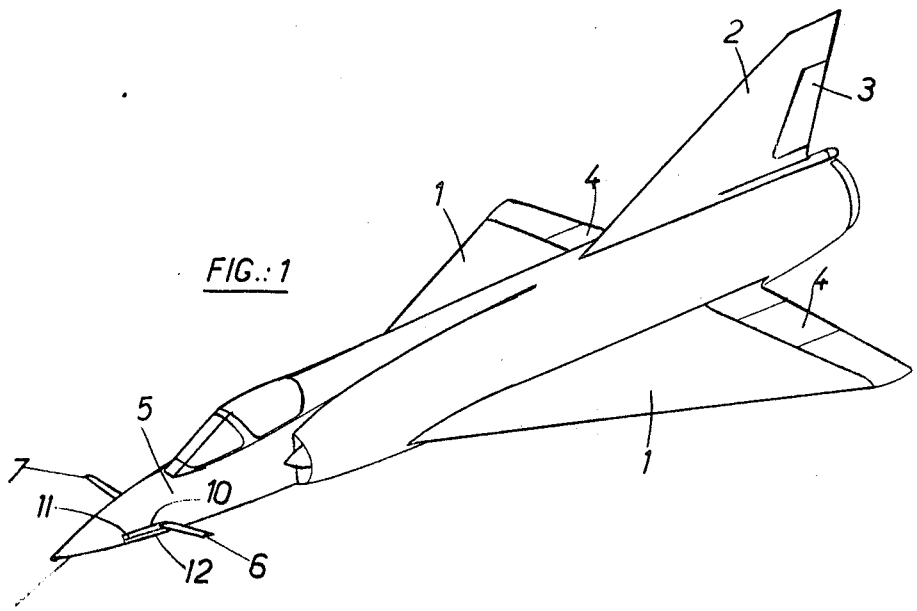
FIG.: 1
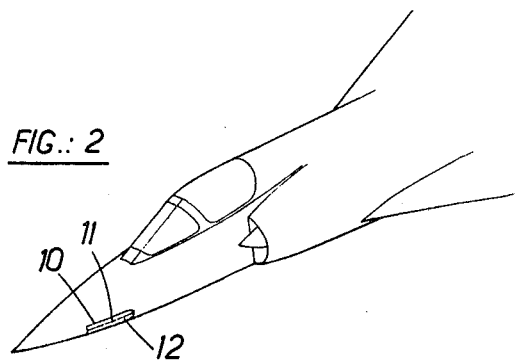
FIG.: 2

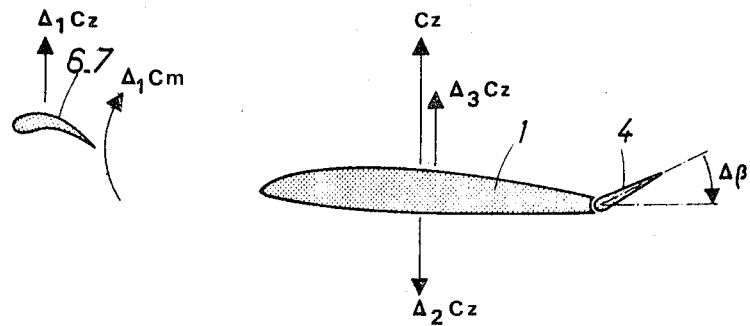
*FIG.: 3*
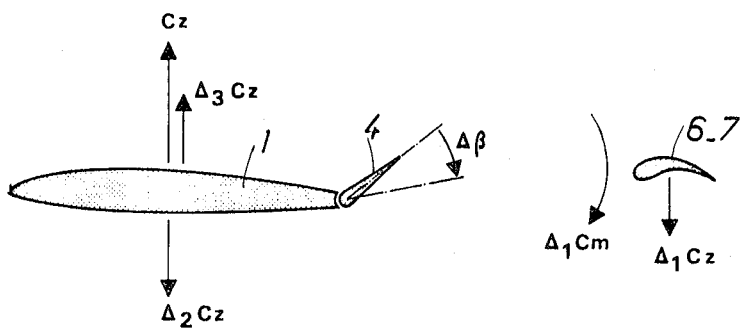
*FIG.: 9*

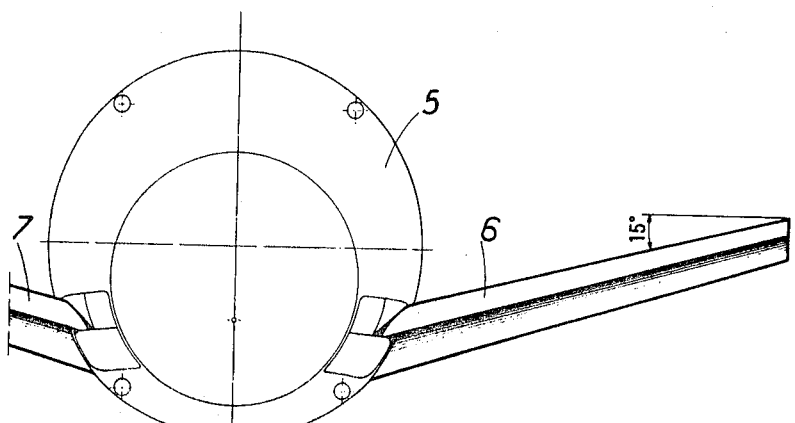
FIG.:7
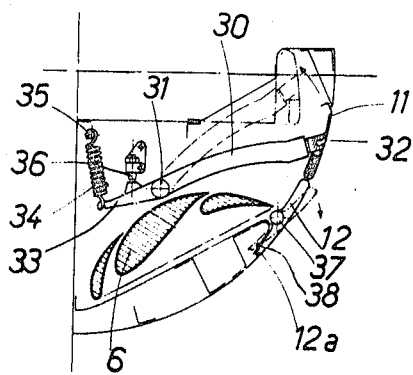
FIG.:8
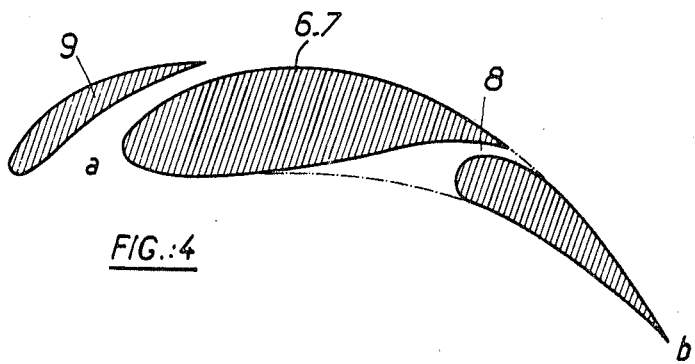
FIG.:4

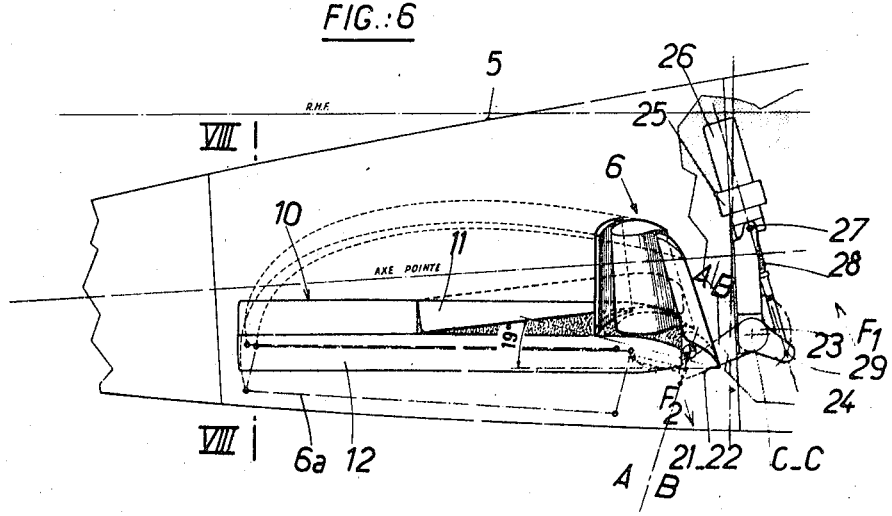
FIG.:6
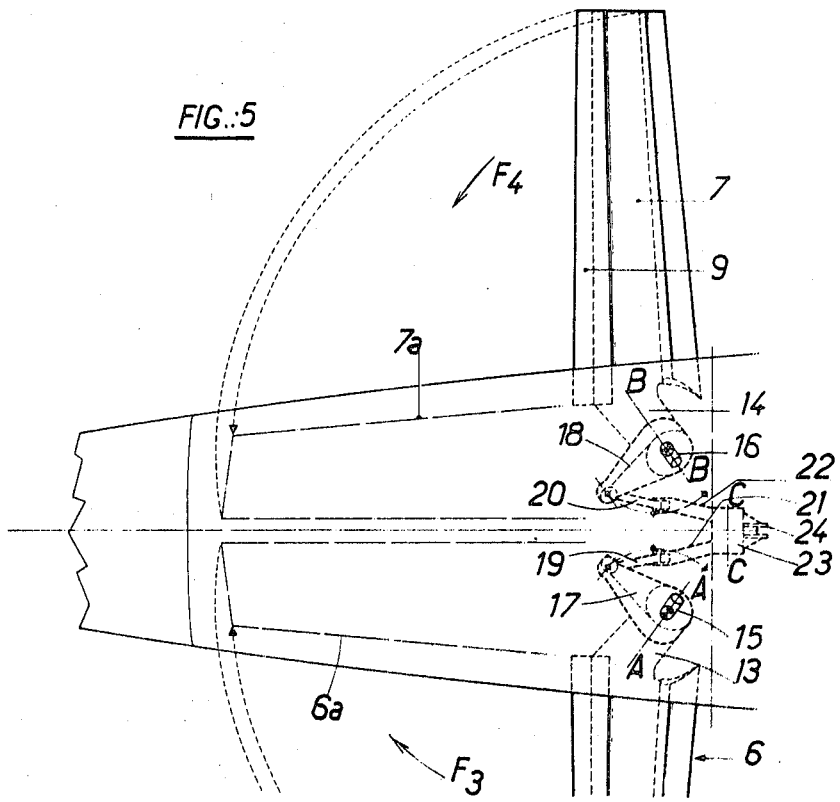
FIG.:5

AIRCRAFT

This invention relates to aircraft and other flying machines, and more particularly to the horizontal stabilizer or tail, sometimes known as empennage, of these machines.

As those skilled in the art will appreciate, the location of this horizontal stabilizer has always posed a problem for aircraft designers.

If it is behind the main plane or wing, and this is generally the case, it is subject to the action of said plane, and this is a severe drawback especially in high-speed aircraft, by which is meant aircraft capable of flying at speeds in excess of Mach 0.8.

If it is in front of the main plane, as in aircraft of the "duck" type, then it is the main plane which is subjected to the action of the stabilizer, and the presence of a stabilizer forward of the center of gravity can give rise to other problems too.

Accordingly, certain kinds of high-speed aircraft have been designed without any separate stabilizer or empennage, in particular delta-winged aircraft.

These aircraft without stabilizers are normally controlled for pitching attitude by means of a control surface located at the trailing edge of the main plane.

While the operation of these aircraft is satisfactory at high and very high air speeds, of high Mach number, at low subsonic speeds, as encountered at takeoff, on approach and on landing, their performance is much less satisfactory. Thus, at these low speeds, the control surface of the trailing edge has to be deflected upwards in order to create a nose-up attitude, but this reduces the lift coefficient of the wing.

This invention relates to a retractable auxiliary wing device which, being designed and profiled for low subsonic speeds of the kind encountered particularly during takeoff, on approach and on landing, makes it possible, by deploying it at these low speeds, to obtain a nose-up pitching moment and an increase in lift, and, by retracting it at high speeds, enables the flight qualities of the stabilizerless aircraft to be maintained at these speeds.

In a preferred embodiment of the invention, the retractable stabilizer arrangement is located on the fuselage ahead of the main plane or wing. It can at will be deployed from the fuselage to form a small auxiliary aerofoil ahead of the main plane, or be folded back into the fuselage or into a fairing formed thereon.

Preferably, the retracting of the aerofoil elements which constitute the stabilizer will be effected by pivoting these elements about a pivot located inside the fuselage or inside a blister fairing.

The description which now follows making reference to the accompanying drawing, will indicate by way of a nonlimitative example how the invention may be carried into practice.

In the drawings:

FIGS. 1 and 2 are perspective views of an embodiment of an improved aircraft in accordance with the invention, respectively showing the stabilizer deployed and retracted.

FIG. 3 is a schematic view showing the aerodynamic effect of the stabilizer.

FIG. 4 is a sectional view on a larger scale, of a suitable aerofoil section for the stabilizer, designed for low-speed flight.

FIGS. 5, 6 and 7 correspond respectively to the embodiments of FIGS. 1 and 2 and illustrate in horizontal projection, front elevation and end elevation, the forward part of the fuselage of the aircraft, equipped with the stabilizer.

FIG. 8 is a section on the line VIII—VIII of FIG. 6, showing certain details.

FIG. 9 is a schematic view similar to that of FIG. 3, illustrating the operation of the retractable stabilizer in accordance with another embodiment of the invention wherein the stabilizer is located behind the main plane.

In FIGS. 1 and 2, a supersonic aircraft of well-known kind, powered by a jet engine and having a main plane of delta-wing kind, has two wings 1 of biconvex supersonic aerofoil form, located symmetrically at either side of the fuselage.

The aircraft has a fin 2, with a rudder 3, but conventionally has no horizontal empennage or stabilizer and is controlled for pitching attitude by means of control surfaces 4 articulated at the trailing edges of the wings 1, and this presents the drawbacks referred to hereinbefore.

In accordance with the invention and in accordance with a preferred embodiment thereof, there is added to the front 5 of the fuselage, a stabilizer which, in the example illustrated consists of two small symmetrical aerofoils 6, 7 which can be retracted into the fuselage.

FIG. 1 illustrates these two aerofoils in the deployed position, and FIG. 2 shows them retracted.

These forward-located stabilizer aerofoils have, in the embodiment illustrated, a fixed aerofoil section which is designed for the low subsonic speed range, this as shown in the schematic illustration of FIG. 3 and also in FIG. 4, which illustrates an appropriate profile.

Thus, FIG. 1 illustrates the aircraft in the configuration corresponding to low subsonic speeds of the order at which the aircraft is travelling at takeoff, on approach and on landing, while FIG. 2 shows the aircraft configuration, stabilizer retracted, appropriate to high-speed flight at speeds in excess of Mach 0.8.

At low speeds, with the stabilizer deployed, a dual effect is obtained. On the one hand, the stabilizer aerofoils provide a low dynamic lift $\Delta_1 C_z$ (FIG. 3) by virtue of their own surface area, which lift, in certain cases, may be wholly or partially cancelled out by the interaction $\Delta_2 C_z$ of this surface with the main plane. On the other hand, the position of the stabilizer, forward of the center of gravity of the overall aircraft, introduces a nose-up pitching couple $\Delta_1 C_m$, which has to be compensated for by a deflection $\Delta\beta$ in the downward direction on the part of the elevators 4 on the main plane, and this provides extra lift $\Delta_3 C_z$ which is not obtained if the stabilizer is not provided.

In accordance with the relative dispositions of the stabilizers and the main plane, one or the other of these effects will predominate.

The stabilizers can be designed in order to satisfy the out-of-balance equation: $\Delta_3 C_z + \Delta_1 C_z > \Delta_2 C_z$.

The aerofoil section of the small aerofoils 6, 7 constituting the stabilizer, their geometric disposition and their position on the aircraft in relation to the latter's center of gravity, (the center of gravity may occupy the normal position), are preferably so contrived, in accordance with one of the features of the invention, that the nose-up pitching couple $\Delta_1 C_m$ is substantially constant throughout the whole range of angles of incidence occurring at the low speeds for which the stabilizer is deployed. The result is that the deployment of the stabilizer at these low speeds, or the retraction thereof as the aircraft speed rises, does not, or at any rate only to a very small extent, modify the position of the center of gravity of the aircraft.

Consequently, the control conditions, with or without stabilizer, are not affected to a sufficient extent to impair flight safety.

FIG. 4 illustrates an aerofoil section which has been used successfully for the aerofoils of the stabilizers. This aerofoil section, between $a$ and $b$, is derived from the French Saint-Cyr no: 156 section by doubling the camber and creating a slot 8 which opens tangentially onto the upper surface of the section towards the trailing edge $b$; this slot is integrated into the aerofoil section. Also provided is a separate slat 9 at the leading edge $a$.

This kind of aerofoil section satisfies the conditions referred to hereinbefore, that the nose-up pitching couple should be approximately constant throughout the range of angles of incidence occurring during low-speed flight, and this in a very simple manner since it contains no movable element of the kind which the pilot would otherwise have to adjust in order to cope with differing angles of incidence.

FIG. 7 also shows the locking of the aerofoils of the stabilizer, in the deployed position, with a positive dihedral of 15°, while in FIG. 6 it can be seen that the angle of incidence of the aerofoils in relation to the reference line is 19°.

It will be seen, also, from a consideration of FIG. 5, that the leading edges of the deployed aerofoils 6, 7, have virtually no sweepback. The leading edge and the trailing edge have furthermore been designed in such a manner as to facilitate retraction into the needle nose of the fuselage.

It should be borne in mind, that these various possibilities are mentioned here purely by way of nonlimitative example. The normal kind of aerodynamic study will have to be carried out in respect of each aircraft type and could lead to other aerofoil sections and attitudes, without departing from the scope of the invention as defined by the appended claims.

The invention enables numerous advantages to be obtained, either separately or conjointly.

The increased lift at low speed, to which there may be added an improvement in the overall sensitivity of the aircraft, makes it possible to secure an improvement in the takeoff performance (for example, reduced takeoff run, steeper angle of climb, higher acceleration), the landing performance (for example reduced approach speed, reduced angle of incidence, steeper glidepath, improvement in the final flare-out and in the precision of touchdown), and finally the maneuverability (for example, reduced radius of turn at low speeds).

Thus, the invention provides the pilot with a greater degree of comfort and confidence in the most critical phases of operation of the aircraft.

In high-speed flight conditions, the retraction of the stabilizer into the body of the fuselage or into an appropriately faired well, or again its folding back along the fuselage, enables the aircraft to maintain its flight qualities and performance characteristics.

It will now be described, in relation to FIGS. 5 to 8 and still by way of example only, how a preferred embodiment of the invention is designed from the mechanical point of view.

The fuselage wall contains at either side of its vertical plane of symmetry and in the lower half, openings of substantially rectangular form which serve for the entry and exit of the aerofoil sections 6, 7 of the stabilizer. In FIGS. 1, 2 and 6, the contour of one of these openings can be seen, marked 10. Each of these openings is closed off by two moving flaps 11, 12 which will be described hereinafter and serve to reconstitute the external profile of the fuselage for high-speed flight conditions.

Each of the aerofoils 6, 7 terminates at its root, inside the fuselage, in an arm 13 or 14, as the case may be, which can pivot about an axis A—A or B—B, respectively. The pivot bearings have not been shown. Pivots 15 and 16 have been illustrated schematically.

The axes of pivot A—A and B—B are oblique and their obliquity is determined by the dihedral which the stabilizer aerofoils are to have when deployed (FIG. 7) and by the substantially longitudinal disposition of the openings 10 formed in the fuselage wall, each of the stabilizer aerofoils thus describing a conic movement about the respective axes A—A and B—B between the retracted and the deployed positions. The arms 13, 14 are appropriately cranked.

A crank arm 17, or 18 as the case may be, is fixed to each of the arms 13, 14 and each of these crank arms is connected by a link 19, 20 with requisite balljoints, to an arm 21 or 22 of a lever 23, which can pivot about an axis C—C perpendicular to the vertical plane of symmetry of the fuselage. An arm 24 of this lever 23, located opposite to the two parallel and symmetrical arms 21, 22 is subjected to the action of a jack 25 carried by the fuselage airframe and located in the vertical plane of symmetry of the aircraft.

If, for example, we consider the stabilizer aerofoils 6, 7 in the deployed position as shown in FIGS. 5 and 6, then it will be seen that operation of the jack in the direction of the arrow $F_1$ will act through the arm 24 of the lever 23 to pivot the arms 21, 22 in the direction of the arrow $F_2$. The result of this is that through the medium of the links 19, 20 and the crank arms 17, 18, the stabilizer aerofoils 6, 7 will be rotated in the direction of the arrows $F_3$, $F_4$ about the axes A—A and B—B, and thus retracted into the fuselage. The retracted position is shown by the chain-dotted lines 6a and 7a in FIGS. 5 and 6. In FIG. 6, furthermore, the loci of a certain number of points have been plotted.

In the embodiment illustrated, the jack 25 is a screwjack the frame of which, carrying the rotating nut and its electric drive motor 26, is articulated about a pivot pin 27 carried by the air frame perpendicular to the vertical plane of symmetry of the fuselage. The screw 28 is articulated at 29 to the arm 24 and the lever 23.

The flaps 11 and 12, associated in pairs with each of the openings in the fuselage, will now be described.

The top flap 11 of each pair is carried by a certain number of parallel arms 30, only one of which can be seen in FIG. 8, it being assumed that the projections of these arms coincide with one another. These arms can pivot independently of one another about a pivot 31 and carry a rear extension 33 to which a return spring 34, secured to the airframe at its remote end 35, is fixed. An adjustable stop 36, cooperating with each rear extension 33, determines the rest position of each arm. The flap 11 is fixed to each of the arms by a small pivot 32.

The bottom flap 12 is mounted to pivot about a pivot pin 37 which extends parallel to the large side of the opening 10, and is biased into the closed position shown in FIG. 8 by a leaf spring 38. The pivot pin 37 is arranged in such a manner that it is located below the trajectory described by the corresponding aerofoil during the latter's pivotal movement.

When the aerofoil is in the retracted position, as shown in FIG. 8, the flaps automatically occupy the positions shown in this Figure, thus closing off the opening in the fuselage.

The flap 12 is maintained in position by the leaf spring 38 which biases the bottom edge 12a of said flap into contact with the internal wall of the fuselage. The flap 11 is held in position by the springs 34 and by contact between the rear extensions 33 and the stops 36, which have been adjusted in such a manner that the flap 11 is flush with the flap 12, the joint line occuring slightly above the line of the trailing edge of the aerofoil.

When the deployment of the aerofoils 6, 7 is produced by the jack 25, each of the aerofoils bears against the top part of its bottom flap 12 causing the latter to pivot against the action of the leaf spring 38, which is deflected. The aerofoil engages beneath the top flap 11, which is thus lifted against the force of the springs 34 and slides over the upper surface of the aerofoil, with which it is maintained in contact by said springs 34. During this movement on the part of the flap 11, it deforms in order to follow as closely as possible the curvature of the top part of the aerofoil section, and this is made possible by the presence of the pivots 32.

Those faces of the flaps 11 and 12 which come into contact with the aerofoil can be made of elastic material in order to be deformable, and be coated with a material of low coefficient of friction such as teflon fabric.

When the aerofoil is fully deployed, the flaps 11, 12 remain a part, in contact respectively with the upper and lower surfaces of the aerofoil, and this enables the aerofoils to withdraw into their well when retracted, following which the flaps return to the closed position shown in FIG. 8 under the action of their respective springs, the surface of the fuselage thus regaining its continuity for proper performance at high speeds.

The top flap 11 can be divided into two or more parts which, due to the provision of the pivots 32, both can align with one another, closing up the fuselage opening completely when the stabilizers have been retracted, and can adopt different angular positions as shown in FIG. 6 when the stabilizers are deployed.

It will be apparent that the embodiment last described could also be modified in various ways without departing from the scope of the invention as defined by the appended claims.

It will be observed that the retraction of the stabilizer aerofoils takes place towards the front of the fuselage. This arrangement is a favorable one as far as the location of the mechanical elements is concerned but, of course, retraction could equally well be carried out towards the rear. Also conceivable would be a retracting movement by translation, the aerofoils being constituted, if required, by telescopic elements. The retractable stabilizer could also comprise several aerofoil elements at either side of the aircraft instead of a single one, and also, although the fixed profile design described is advantageous since it does not require the pilot to implement any control maneuvers, it would be equally possible to conceive of stabilizer aerofoils with controllable elements.

Another variant embodiment is one in which the retractable stabilizer aerofoils are located not forward of the main plane but to the rear thereof, this being an arrangement which in particular would facilitate sweepback of the trailing edge of the main wings. This kind of design is shown schematically in FIG. 9.

In this case, the lift $\Delta_1 C_z$ of the stabilizer 6, 7, when deployed, has to be directed towards the rear in order to produce the nose-up pitching couple $\Delta_1 C_m$, which would require a downward deflection $\Delta\beta$ of the elevators to obtain the corresponding lift $\Delta_3 C_z$. The arrangement would than have to satisfy the out of balance equation:

$$\Delta_3 C_z > \Delta_1 C_z + \Delta_2 C_z.$$

I claim:

1. In an aircraft for high-speed flight the combination comprising:
   a fuselage;
   a main wing;
   a pair of stabilizer aerofoils;
   means mounting the stabilizer aerofoils for movement between retracted and deployed positions relative to the fuselage; and
   driving means for effecting movement of the stabilizer aerofoils, which are adapted and profiled for subsonic flight conditions to produce in the deployed condition a lift giving rise to a nose-up pitching movement, the improvement comprising:
   housing means disposed entirely inside said fuselage for accommodating each of said aerofoils when in retracted position whereby to withdraw the same from the streamlined flow of ambient air over said fuselage,
   said fuselage having openings formed on opposite sides thereof in communication with said housing means for the passage of respective aerofoils out of or into said housing means, and means for closing each said openings when said aerofoils are in retracted position, said closure means being mounted for movement to an inoperative position within the interior of said housing to open said openings for deployment of said aerofoils.

2. The combination according to claim 1, wherein the retractable aerofoils each contain a slot which opens tangentially onto the upper surface of the aerofoil towards the trailing edge.

3. The combination according to claim 1, wherein the retractable aerofoils each have a separate slat at the leading edge.

4. The combination according to claim 1, wherein each opening is closable by two spring-loaded flaps respectively cooperating with the upper and lower surfaces of the retractable aerofoil during the retracting or deploying movements.

5. The combination according to claim 4, wherein the joint line between the two flaps associated with one and the same retractable aerofoil, is slightly above the line of the trailing edge of said aerofoil, and the bottom flap is mounted to pivot about the longitudinal axis disposed beneath said line so that said flap tilts under the action of the thrust exerted on it by the aerofoil while the top flap is deflected by the upper surface of the aerofoil.

6. The combination according to claim 4, including mounting means for the upper of the two flaps comprising a rocking arm and pivotal means connecting the top flap to the rocking arm.

7. The combination according to claim 1, wherein said retractable aerofoils are pivoted about their respective axes at an angle with each other which is substantially bisected by the longitudinal plane of said aircraft, whereby said aerofoils when in deployed position form a dihedral system.

* * * * *